United States Patent [19]

Schmidt

[11] 3,838,956

[45] Oct. 1, 1974

[54] DEVICE FOR MOLDING A SOLE ONTO A SHOE UPPER

[76] Inventor: Karin Schmidt, Feldgasse 2, Kittsee, Austria

[22] Filed: Aug. 24, 1971

[21] Appl. No.: 174,368

[30] Foreign Application Priority Data

Sept. 3, 1970 Austria........................ A8036/70

[52] U.S. Cl................................... 425/119, 264/338

[51] Int. Cl................................................. B29c 1/02

[58] Field of Search...... 425/119, DIG. 44; 264/338

[56] References Cited

UNITED STATES PATENTS

| | | | |
|---|---|---|---|
| 353,617 | 11/1886 | Banks | 249/135 X |
| 2,259,854 | 10/1941 | Langel | 249/135 X |
| 2,435,285 | 2/1948 | Lucia | 425/DIG. 44 |
| 2,820,251 | 1/1958 | Fraser | 425/119 X |
| 3,248,468 | 4/1966 | Anderson | 425/117 X |
| 3,510,914 | 5/1970 | Hujik | 425/119 X |

*Primary Examiner*—R. Spencer Annear
*Attorney, Agent, or Firm*—Karl F. Ross

[57] ABSTRACT

A device for molding a sole onto a shoe upper includes a profiled base embraced by an elongate frame which defines with it a mold cavity closed at the top by a last carrying the upper. The frame is split at one end to form a pair of jaws interconnected by a resiliently deformable hinge at the opposite end, the hinge tending to hold the jaws closed. An inlet for the injection of moldable material is formed by a pair of complementary grooves on the confronting faces of the free jaw ends. The frame is integral and may consist of elastomeric material which is rigidified in the region of the jaws.

9 Claims, 2 Drawing Figures

II
3
1
2
10
10
11
11
14
6
9
16
4
5
9
METALLIC STIFFENER
II

Karin SCHMIDT
INVENTOR

BY Karl F. Ross

Attorney

DEVICE FOR MOLDING A SOLE ONTO A SHOE UPPER

FIELD OF THE INVENTION

My present invention relates to a device for molding a sole, with or without a heel, onto a shoe upper carried on a last.

BACKGROUND OF THE INVENTION

Known devices for applying soles and/or heels to uppers of shoes comprise a two-part mold frame. To connect a sole to the upper, the two halves of the mold frame are pulled apart, a suitably profiled bottom punch is inserted, and the two halves are pushed together. The upper of the shoe together with its last, closes up the mold cavity and is held in position by the mold frame. The material for forming the sole is then injected through an inlet opening in the mold frame. When the material has hardened, the halves of the mold frame are pushed apart so that the shoe can be removed from the mold cavity.

These known devices with two-part mold frames have the disadvantage that a flash is formed on the sole or heel at the joint between the mold halves even if the same are most precisely machined at that joint. Such a flash is particularly undesirable on the rear of the shoe because the upper is provided at its rear with a seam in any case and it is very difficult to align the flash formed by the sole material with the seam of the upper. A misalignment of these two lines results in an unsightly appearance so that such shoes are not attractive to a buyer. Expensive aligning and machining operations are required if satisfactory shoes are to be made in this way.

A vulcanizing mold is also known which comprises an integral mold frame of resilient strip steel provided with a continuous parting surface adjacent to the heel so that the frame can be swung open and closed. Whereas the use of this mold frame avoids one of the flashes, a strip-steel frame will not retain its shape but will be deformed under a somewhat higher or irregular pressure applied to the last or upper or during the injection of the sole-forming material so that the resulting sole will not have the desired shape.

OBJECT OF THE INVENTION

It is an object of the invention to avoid the above-mentioned disadvantages of conventional sole-molding devices and to provide a device of this character which comprises a dimensionally stable mold frame and enables the production of shoes which have no flash on one side.

SUMMARY OF THE INVENTION

I realize the aforestated object by the provision of a base which, like the bottom punch of a conventional shoe mold, is profiled in conformity with the underside of a sole to be molded and which is surrounded by an elongate frame forming therewith a sole-shaped cavity to be closed at the top by the last carrying the shoe upper, this frame including a pair of rigid jaws and a resilient nonmetallic hinge integral with these jaws, the hinge being preferably disposed in the region of the heel so as to extend around a heel-forming depressing in the base. The two jaws terminate in free ends which contact each other along a parting surface in a closed position into which the frame is biased by the resilient hinge. For assembling the mold and withdrawing the finished article therefrom, the jaws are spreadable against the biasing force of the hinge into an open position in which the frame is substantially U-shaped with the hinge defining the bight of the U.

For the introduction of the moldable material I prefer to provide the frame with an inlet constituted by two complementary grooves on the confronting faces of the jaw ends. No flash or burr will appear on the finished article in the region of the hinge, thus at the heel in the preferred construction in which the frame opens at the toe portion of the sole.

The frame is advantageously provided along its upper inner edge with a peripheral recess bonded by a last-engaging lip to hold the last and the upper in position on top of the mold cavity.

According to another feature of the invention, the frame of my improved sole mold has a body of rubber or other elastomeric material fortified with metallic reinforcements or other regidifying fillers at its jaws so as to reduce its resiliency everywhere except at the hinge.

BRIEF DESCRIPTION OF THE DRAWING

The invention will be described more fully hereinafter with reference to the accompanying drawing showing an illustrative embodiment to which the invention is not restricted. In the drawing.

SPECIFIC DESCRIPTION

Figure 1:
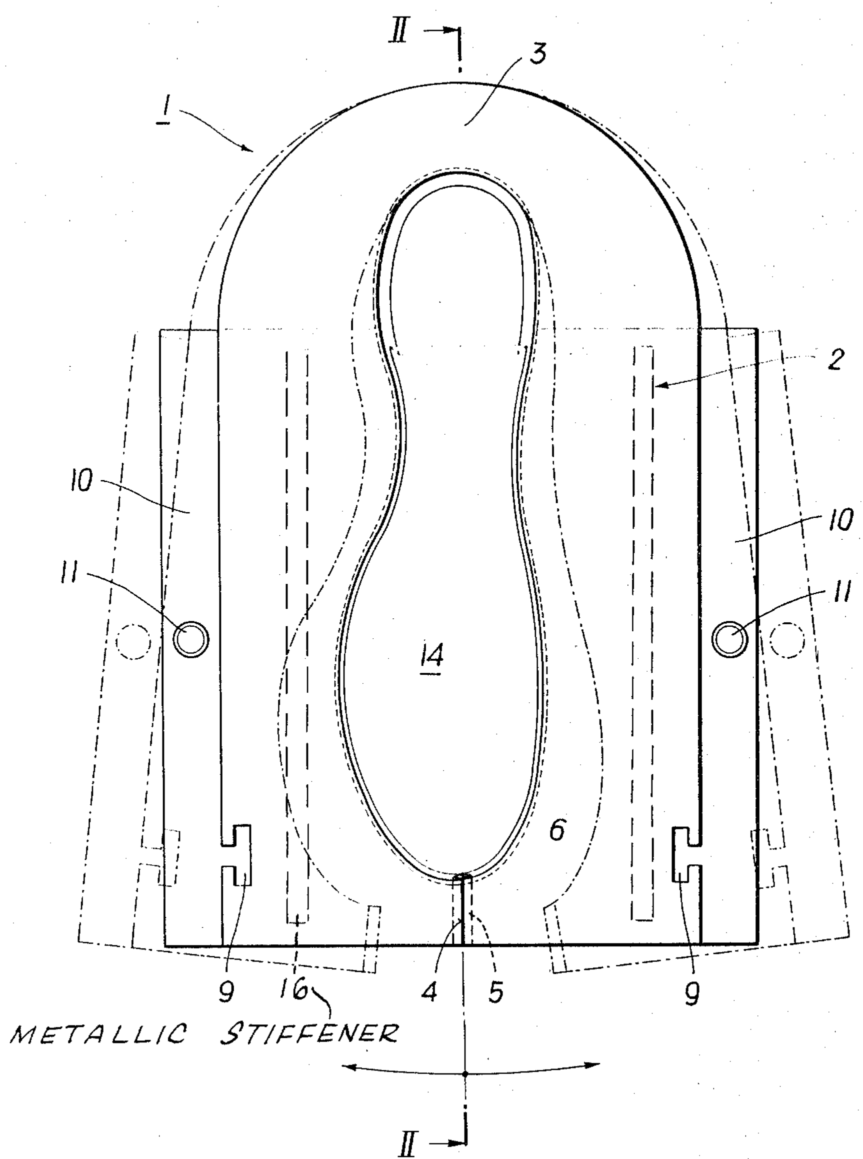
FIG. 1 is a top plan view showing a device according to the invention, illustrated in solid lines in a closed position and in dotted lines in an open position.
Figure 2:
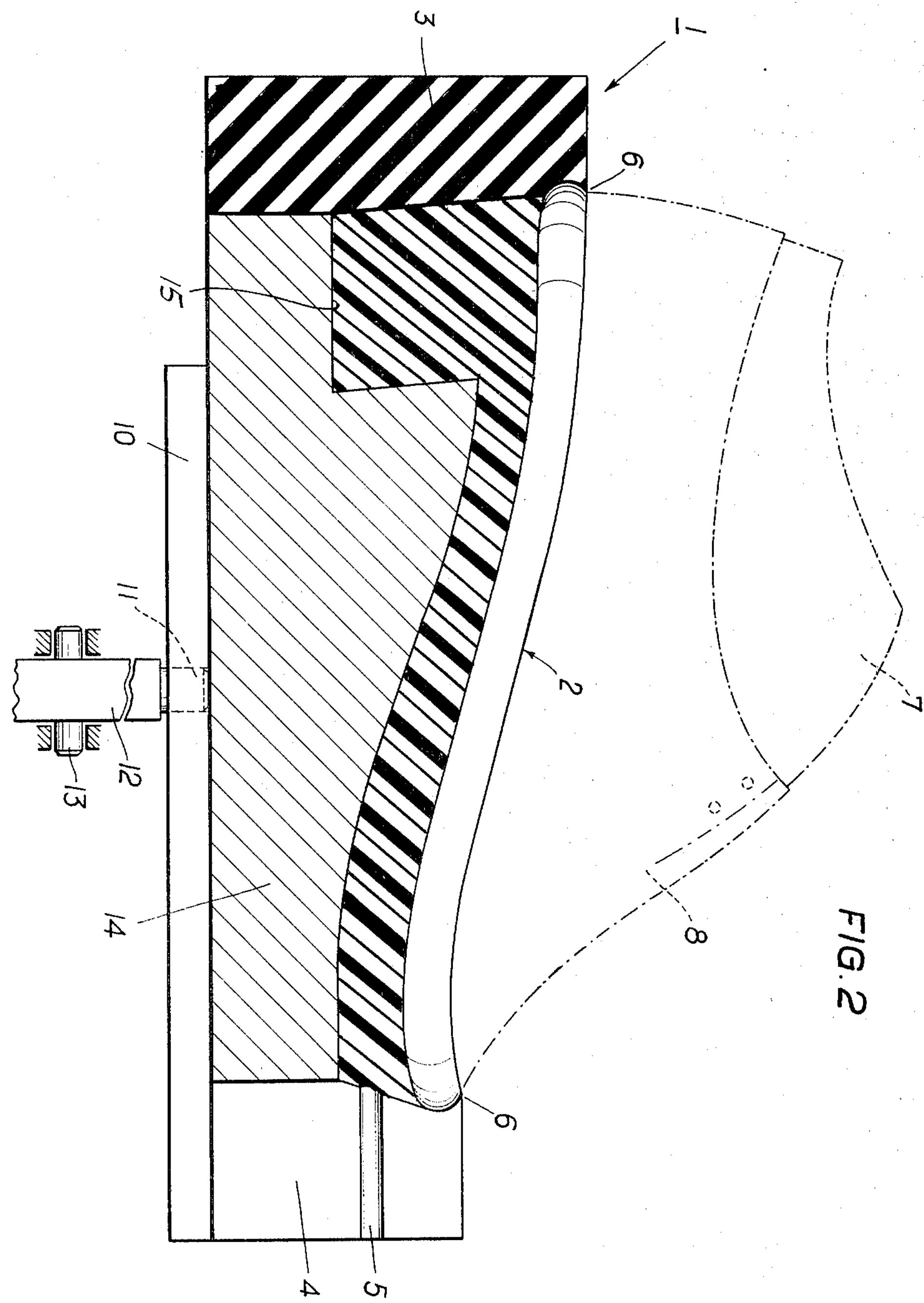
FIG. 2 is a sectional view taken on line II—II of FIG. 1.

The device according to the invention comprises an integral mold frame 1, which consists of a substantially rigid portion forming a pair of jaws 2 and a resilient hinge portion 3 interconnecting these jaws. The internal shape of the mold corresponds to the external shape of a sole of a shoe, inclusive of the heel, and in the embodiment shown in the drawing the hinge portion 3 is disposed near the heel. The mold frame is split along a continuous parting surface 4 near the toe portion of the shoe. In the same region, the frame has an inlet opening 5 for the injection of the material from which the sole is formed this inlet being constituted by two complementary grooves disposed on confronting faces of the free ends of jaws 2 which are separated by the parting surface 4.

Inner upper edge of the mold frame 1 is provided with a last-engaging lip 6 so that the mold frame 1 in its closed position can hold a shoe upper 8 applied to a last 7.

The jaws 2 of mold frame 1 are connected by tongue-and-groove joints 9 to respective levers 10 which extend approximately in the longitudinal direction of the shoe and are pivoted on respective pins 11.

The pivots 11 are approximately parallel to the imaginary axis defined by the hinge portion 3. Each pivot 11 is secured to an arm 12 which is pivoted on a pin 13 that is transverse to the pin 11.

The bottom of the mold cavity is defined by a base 14 which is inserted into the mold frame and has a top surface which is complementary to the desired shape of the sole and is shown formed with a depression 15 for the molding of the heel.

The opperation of the device embodying my invention is as follows:

The arms 12 are swung outward, preferably by pneumatic means, so that the mold frame is moved to the open position shown in dotted lines in FIG. 1. In this operation, the levers 10 perform a pivotal movement about pins 11 and the jaws 2 are swung open so that their free ends separate and the hinge portion 3 is elastically deformed. The base 14 is now inserted into the mold frame to define therewith a cavity in which it need not be exactly centered. The upper 8 applied to the last 7 is then placed on the mold frame 1, which is subsequently closed by means of the arms 12. In this operation, the base 14 is centered automatically and the upper is retained on the mold frame by the clamping lip 6. The material for molding the sole is injected through the opening 5 into the cavity. When the injected material has hardened, the finished shoe can be removed after a reopening of frame 1.

In FIG. 1 I have diagrammatically illustrated metallic stiffeners 16 embedded in the jaw portions 2 of frame 1 to rigidify same.

What is claimed is:

1. A device for molding a sole onto a shoe upper carried on a last, comprising:

a base with an upper surface conforming to the underside of a sole to be molded; and an elongate frame surrounding said base and forming therewith a sole-shaped cavity closed at the top by the last, said frame including a pair of rigid jaws and a resilient non-metallic hinge integral with said jaws, the latter being provided with free ends remote from said hinge contacting each other in a position of closure into which said jaws are biased by said hinge, said jaws being spreadable against the biasing force of said hinge into an open position in which said frame is substantially U-shaped with the hinge defining the bight of the U.

2. A device as defined in claim 1 wherein said frame is provided with an inlet for the introduction of molding material into said cavity.

3. A device as defined in claim 2 wherein said inlet comprises a pair of complementary grooves on said free ends.

4. A device as defined in claim 2 wherein said frame has a body of elastomeric material provided with rigidifying reinforcements at said jaws.

5. A device as defined in claim 4 wherein said reinforcements are metallic stiffeners imbedded in said body.

6. A device as defined in claim 1 wherein said jaws are provided with lever means for spreading same into said open position.

7. A device as defined in claim 1 wherein said frame is provided along its upper inner edge with a last-engaging peripheral lip.

8. A device as defined in claim 1 wherein said base is provided with a heel-forming depression.

9. A device as defined in claim 8 wherein said hinge extends around said depression.

* * * * *